Dec. 26, 1967   H. L. CALL   3,359,675
AUXILIARY BARBED SPUR FISH HOOK
Filed March 29, 1965
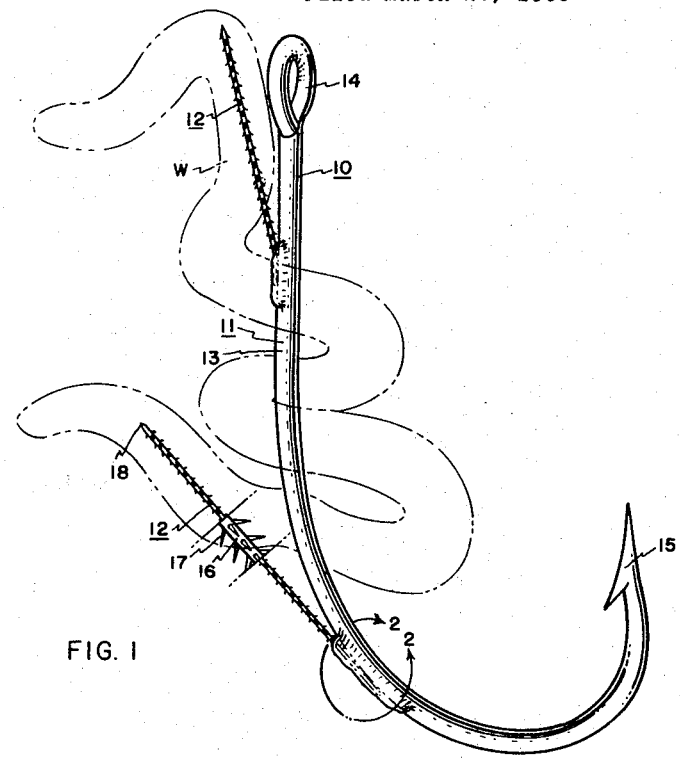
FIG. I
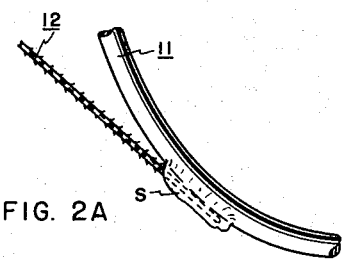
FIG. 2A
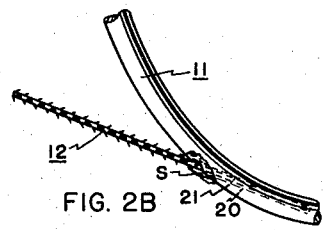
FIG. 2B
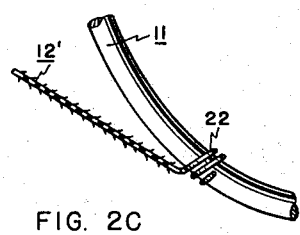
FIG. 2C
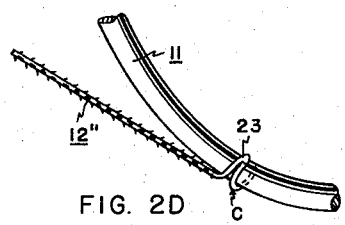
FIG. 2D
INVENTOR.
HOWARD L. CALL
BY M. Ralph Shaffer
HIS ATTORNEY

United States Patent Office 3,359,675
Patented Dec. 26, 1967

3,359,675
AUXILIARY BARBED SPUR FISH HOOK
Howard L. Call, 455 24th St., Ogden, Utah 84401
Filed Mar. 29, 1965, Ser. No. 443,551
1 Claim. (Cl. 43—44.8)

ABSTRACT OF THE DISCLOSURE

This invention comprises a fish hook means wherein the same includes a conventional fish hook and a bait-retaining barbed spur projecting therefrom. The latter has a cross-section very much smaller than the cross-section of the hook proper and is designed to keep bait alive for a longer time than were the bait mounted to the hook proper.

---

The present invention relates to a novel fish hook or an attachment to a conventional fish hook and, more particularly, to fish hook means whereby, by the provision of outwardly projecting spur means, baits of various types can be secured to a fish hook in a manner such that the life of the bait and retention thereof are preserved and enhanced.

In the past many types of fish hooks of all types, sizes, and descriptions have been devised. None, however, to the inventor's knowledge have incorporated suitable bait retention means which will insure long life of the bait employed, and this in a manner such that the bait retention means is not loaded when a fish is hooked. In the present case of fresh water fishing, if a fisherman hooks a worm by a conventional fish hook, the life of the worm is soon taken, this caused by the necessarily enlarged diameter of the fish hook required for catching a fish. The inventor has conceived the idea of having barbed spur means, either releasably secured to or affixed to a conventional fish hook, whereby the spur means is employed merely to retain the bait in proximity with the hook. Such will serve ideally to camouflage the hook through the imposition of bait on the spurs and, more especially, provides means to retain bait proximate the hook without the necessity of forcing the large fish hook through the bait proper.

Accordingly, an object of the present invention is to provide a novel fish hook.

A further object is to provide a fish hook means providing one or more spurs, the latter being suitably barbed for retention of the bait proximate the hook.

A further object is to provide spur means for a fish hook wherein it is not necessary for the fish hook proper to pass through the body of the bait in order to retain the same in proximity with the fish hook.

An additional object is to provide spur means of such a configuration that its attachment to a fish hook and use therewith of securing bait in proximity with the fish hook will prolong the life of the bait.

An additional object is to provide means for securing one or more desired types of bait in proximity with the shank of a fish hook.

The features of the present invention which are believed to be novel are set forth with particularity in the appended claims. The present invention, both as to its organization and manner of operation, together with further objects and advantages thereof, may best be understood by reference to the following description, taken in connection with the accompanying drawing in which:

FIGURE 1 is a side elevation of a fish hook incorporating the principles of the present invention and showing a portion of the spur shank enlarged.

FIGURES 2A–2D represent various modifications of an enlarged detail, taken along the line 2—2 in FIGURE 1, indicating various ways in which the spur means employed in the invention may be affixed or secured to the fish hook member used.

In FIGURE 1 the fish hook 10 of the present invention is shown to include a fish hook 11 and a spur 12 secured to fish hook member 11 and outwardly projecting therefrom. In particular, the fish hook member 11 is conventionally formed, having a hook-configured shank 13 terminating in eye 14 at one extremity and in a barbed point 15 at the remaining extremity thereof. The outwardly-projecting spur 12 includes a preferably elongate, spur shank 16 and at least one but preferably a plurality of barbs 17, termed "retainer barbs," which open in a general direction toward fish hook member 11 and away from the extremity 18 of the spur. For purposes of illustration, a pair of mutually spaced spurs 12 are indicated. It will be understood that there may be used merely one spur or conceivably more than the two spurs as shown. The spurs themselves will preferably take the form of the element which is used sometimes by dentists as a broach for root canal work. This is to say, the spur will be very fine and preferably have a transverse cross-section less than half the cross-section of the fish hook member. The outwardly projecting barbs associated with the spur will be very fine so that there will be no discomfort to the one picking up the fish hook even at a spur area. The barbs on the spur are directed toward the fish hook member so that any bait urged upon the spur will tend to remain engaged therewith.

FIGURES 2A–2D indicate various ways in which the individual spurs 12 may be attached or otherwise secured to fish hook member 11. In FIGURE 2A the spur 12 is simply soldered, by solder S, tangentially to the outer periphery to the fish hook member 11. In FIGURE 2B an elongate aperture 20 is provided in fish hook member 11 to accommodate the reception of extremity 21 of spur 12. Solder S is thereafter applied to the juncture. In FIGURE 2C the extremity of spur 12′, corresponding to spur 12 in FIGURE 1, is simply wrapped at extremity 22 around the fish hook member 11. The end 22 may be helically formed and the spur made of spring wire so that an easy retentive engagement of the spur 12′ with fish hook member 11 may be accomplished. Of course, one or more spurs may be case or otherwise disposed integrally with the respective fish hook.

In FIGURE 2 the spurs 12″, corresponding to the spur 12 in FIGURE 1, includes an extremity 23 configured in the form of a clip C which springingly engages the fish hook member 11.

Thus, it is seen that the novel fish hook of the present invention may be manufactured as an integral part, or one or more spurs of the invention may be affixed to a conventional fish hook as is shown, for example, in FIGURES 2C and 2D.

In operation, the user will provide a fish hook, configured according to the present invention, see FIGURE 1, and will dispose bait upon the spurs 12 employed. Thus, as seen with reference to the dotted line configuration in FIGURE 1, the worm W at one extremity will be disposed over the upper spur 12, the worm wrapped around the fish hook, and the remaining extremity thereof pressed onto spur 12. This arrangement keeps the angle worm, night crawler, or other bait secured to the fish hook member 11 without chancing the premature killing of the bait. Were the worm simply pressed onto the fish hook member 11 in the usual manner, then the worm would soon die and cease its motion in the water which is so attractive to fish.

It is noted that when the hook is set in a fish nibbling at the bait, the spurs will not take any of the loading as a consequence of hooking the fish; rather, the spurs are used simply to retain the worm in proximity with the hook.

In practice it is preferred that the spurs have a diameter not exceeding one-thirty-second of an inch, and preferably smaller. The maximum transverse cross-section of the spur should be substantially smaller than, i.e., should be less than half, the transverse cross-section of the fish hook. Notwithstanding this small size, the barbs of the spur in being oriented toward the hook and away from the penetration point 18 will easily serve to keep the worm or other bait in proximity with the hook and alive for some time.

Where two spurs are employed as in FIGURE 1, then both extremities of the worm, for example, are easily secured. However, but one or many more than two spurs may be employed if desired. It is preferable that the spurs be attached to the fish hook member 11 such that they point away from the barb point 15 and nominally tangentially to the fish hook member.

Where a construction similar to that shown in FIGURE 2C is employed, then the spur is adapted to slip up and down the shank of the fish hook member 11. This will further aid the worm in retaining life, and its motions will be restricted only by the extremities in the form of eye 14 and barbed point 15. Of course, more than one spur may be employed as in the case of FIGURE 2C.

FIGURES 2C and 2D illustrate ideal spur attachments for conventional fish hooks wherever the same might be attached to any chosen fish hook for any desired purpose.

Many baits may be accommodated by the present invention, for example, worms, salmon eggs, shrubs, rock holders, maggots, and even grasshoppers.

While particular embodiments of the present invention have been shown and described, it will be obvious to those skilled in the art that changes and modifications may be made without departing from this invention in its broader aspects, and, therefore, the aim in the appended claim is to cover all such changes and modifications as fall within the true spirit and scope of this invention.

I claim:

A fish hook including, in combination, a fish-retrieving, fish-hook member having a hook-configured shank terminating in an eye at one extremity and a barbed point at the remaining extremity; and a bait-mounting, continuously barbed, elongate spur means secured at one extremity to said hook-configured shank at a region on the outside longitudinal periphery of said shank and remote from said barbed point, said elongate spur means projecting away from said barbed point and having a transverse cross-section substantially smaller than the transverse cross-section of said shank.

References Cited

UNITED STATES PATENTS

| | | | |
|---|---|---|---|
| 1,249,342 | 12/1917 | Dahl | 43—44.82 X |
| 2,668,387 | 2/1954 | Gallardo | 43—44.82 X |
| 2,054,976 | 9/1936 | Gould | 43—44.8 XR |
| 2,087,369 | 7/1937 | Woodring | 43—44.8 |
| 2,605,580 | 8/1952 | Moore | 43—44.8 |
| 2,888,772 | 6/1959 | Lawter | 43—44.8 XR |
| 3,061,968 | 11/1962 | Stroud | 43—44.8 |

FOREIGN PATENTS

| | | |
|---|---|---|
| 1,160,930 | 3/1958 | France. |
| 243,801 | 2/1947 | Switzerland. |

SAMUEL KOREN, *Primary Examiner.*

D. J. LEACH, *Assistant Examiner.*